(12) United States Patent
Nasrollahi

(10) Patent No.: US 12,456,301 B2
(45) Date of Patent: Oct. 28, 2025

(54) METHOD OF TRAINING A MACHINE LEARNING ALGORITHM TO IDENTIFY OBJECTS OR ACTIVITIES IN VIDEO SURVEILLANCE DATA

(71) Applicant: MILESTONE SYSTEMS A/S, Brøndby (DK)

(72) Inventor: Kamal Nasrollahi, Brøndby (DK)

(73) Assignee: MILESTONE SYSTEMS A/S, Brøndby (DK)

( * ) Notice: Subject to any disclaimer, the term of this patent is extended or adjusted under 35 U.S.C. 154(b) by 538 days.

(21) Appl. No.: 17/929,995

(22) Filed: Sep. 6, 2022

(65) Prior Publication Data

US 2023/0081908 A1 Mar. 16, 2023

(30) Foreign Application Priority Data

Sep. 10, 2021 (EP) .................................... 21196002

(51) Int. Cl.
*G06V 20/52* (2022.01)
*G06N 20/00* (2019.01)
(Continued)

(52) U.S. Cl.
CPC ............ *G06V 20/52* (2022.01); *G06N 20/00* (2019.01); *G06T 7/194* (2017.01); *G06T 7/70* (2017.01); *G06T 17/00* (2013.01); *G06V 10/7747* (2022.01); *G06T 2207/10028* (2013.01); *G06T 2207/20081* (2013.01); *G06V 2201/07* (2022.01)

(58) Field of Classification Search
None
See application file for complete search history.

(56) References Cited

U.S. PATENT DOCUMENTS 10,497,257 B2 * 12/2019 Sohn ................. G08G 1/048
11,366,981 B1 * 6/2022 Paz-Perez ......... G06V 10/778
(Continued)

FOREIGN PATENT DOCUMENTS

WO 2019/113510 A1 6/2019
WO 2020/228766 A1 11/2020

OTHER PUBLICATIONS

Olaf Ronneberger, et al., U-Net: Convolutional Networks for Biomedical Image Segmentation, arXiv: 1505.04597v1 [cs.CV] May 18, 2015.
(Continued)

*Primary Examiner* — Anand P Bhatnagar
(74) *Attorney, Agent, or Firm* — Canon U.S.A., Inc. IP Division

(57) ABSTRACT

A method of training a machine learning algorithm to identify objects or activities in video surveillance data comprises generating a 3D simulation of a real environment from video surveillance data captured by at least one video surveillance camera installed in the real environment. Objects or activities are synthesized within the simulated 3D environment and the synthesized objects or activities within the simulated 3D environment are used as training data to train the machine learning algorithm to identify objects or activities, wherein the synthesized objects or activities within the simulated 3D environment used as training data are all viewed from the same viewpoint in the simulated 3D environment.

12 Claims, 4 Drawing Sheets

(51) Int. Cl.
  *G06T 7/194* (2017.01)
  *G06T 7/70* (2017.01)
  *G06T 17/00* (2006.01)
  *G06V 10/774* (2022.01)

(56) References Cited

U.S. PATENT DOCUMENTS

| | | | |
|---|---|---|---|
| 12,014,446 B2* | 6/2024 | Koh | G06F 18/213 |
| 2019/0065853 A1* | 2/2019 | Sohn | G06F 18/214 |
| 2020/0175759 A1 | 6/2020 | Russell et al. | |
| 2020/0294194 A1 | 9/2020 | Sun | |
| 2022/0157049 A1* | 5/2022 | Inoshita | G06T 15/503 |
| 2022/0157136 A1* | 5/2022 | Metzler | G08B 13/19647 |
| 2022/0237908 A1* | 7/2022 | Yang | G06T 19/003 |
| 2022/0406066 A1* | 12/2022 | Rangarajan | G06V 10/774 |
| 2023/0072293 A1* | 3/2023 | Koh | G06T 7/10 |
| 2023/0177811 A1* | 6/2023 | Nadler | G06V 20/647 |
| | | | 382/159 |

OTHER PUBLICATIONS

Andrey Kuryenkov, et al., DeformNet: Free-Form Deformation Network for 3D Shape Reconstruction from a Single Image, arXiv:1708.04672v1 [cs.CV] Aug. 11, 2017.

Jhony K. Pontes, et al., Image2Mesh: A Learning Framework for Single Image 3D Reconstruction, arXiv: 1711.10669v1 [cs.CV] Nov. 29, 2017.

Mennatullah Siam, et al., RTSEG: Real-Time Semantic Segmentation Comparative Study, arXiv: 1803.02758v5 [cs.CV] May 16, 2020.

Chaoqiang Zhao, et al., Monocular Depth Estimation Based On Deep Learning: An Overview, arXiv:2003.06620v2 [cs.CV] Jul. 3, 2020.

Jae-Han Lee, et al., Single-Image Depth Estimation Based on Fourier Domain Analysis, 2018 IEEE/CVF Conference on Computer Vision and Pattern Recognition, 2018.

Johannes Kopf, et al., One Shot 3D Photography, ACM Trans. Graph., vol. 39, No. 4, Article 76. Jul. 2020.

Changqian Yu, et al., BiSeNet: Bilateral Segmentation Network for Real-time Semantic Segmentation, ECCV 2018: Computer Vision—ECCV 2018, Computer Vision Foundation.

Di Lin, et al., Multi-Scale Context Intertwining for Semantic Segmentation, ECCV 2018: Computer Vision—ECCV 2018, Computer Vision Foundation.

Haoqiang Fan, et al., A Point Set Generation Network for 3D Object Reconstruction from a Single Image, 2017 IEEE Conference on Computer Vision and Pattern Recognition (CVPR), 2017.

Zilong Huang, et al., CCNet: Criss-Cross Attention for Semantic Segmentation, 2019 IEEE/CVF International Conference on Computer Vision (ICCV), 2019.

Andrey Ignatov, et al., Fast and Accurate Single-Image Depth Estimation on Mobile Devices, Mobile AI 2021 Challenge: Report, 2021 IEEE/CVF Conference on Computer Vision and Pattern Recognition Workshops (CVPRW), 2021.

Xin Wu, et al., Improvement of Mask-RCNN Object Segmentation Algorithm, Intelligent Robotics and Applications. ICIRA 2019. Lecture Notes in Computer Science, vol. 11740, 2019.

Fabio Tosi, et al., Learning monocular depth estimation infusing traditional stereo knowledge, 2019 IEEE/CVF Conference on Computer Vision and Pattern Recognition (CVPR), 2019.

Chaoyang Wang, et al., Learning Depth from Monocular Videos using Direct Methods, The IEEE Conference on Computer Vision and Pattern Recognition (CVPR), 2018.

Haozhe Xie, et al., Pix2Vox: Context-aware 3D Reconstruction from Single and Multi-view Images, 2019 IEEE/CVF International Conference on Computer Vision (ICCV), 2019.

Shuran Song, et al., Sun RGB-D: A RGB-D Scene Understanding Benchmark Suite, CVPR, 2015, https://openaccess.thecvf.com/content_cvpr_2015/papers/Song_SUN_RGB-D_A_2015_CVPR_paper.pdf.

* cited by examiner

METHOD OF TRAINING A MACHINE LEARNING ALGORITHM TO IDENTIFY OBJECTS OR ACTIVITIES IN VIDEO SURVEILLANCE DATA

CROSS-REFERENCE TO RELATED APPLICATIONS

This application claims the benefit under 35 U.S.C. § 119(a)-(d) of European Patent Application No. 21196002.6, filed on Sep. 10, 2021 and titled "A METHOD OF TRAINING A MACHINE LEARNING ALGORITHM TO IDENTIFY OBJECTS OR ACTIVITIES IN VIDEO SURVEILLANCE DATA". The above cited patent application is incorporated herein by reference in its entirety.

TECHNICAL FIELD OF THE DISCLOSURE

The present disclosure relates to a method, apparatus and computer program for training a machine learning algorithm to identify objects or activities in video surveillance data, and a video surveillance method using a machine learning algorithm to identify objects or activities in video surveillance data.

BACKGROUND OF THE DISCLOSURE

Many video analytics software modules that utilise machine learning algorithms are available which can analyse video surveillance data and detect specific objects or activity. These software modules can be provided in a video management system that processes data from multiple cameras, but as processing capacity in cameras increases, they are increasingly provided in the cameras themselves ("on edge"). Analytics modules on the edge identify objects or activity in the video data from the camera, and generate metadata describing the detected objects or activity and indicating a time and position in the frame (eg bounding box coordinates) where the objects or activity have been detected. The metadata is sent to the video management system where it is stored on a recording server with the video data. Metadata can be used by a client device to generate alerts, provide visual indications on live or recorded video or can be used to search stored video data.

An example of object detection would be a human detection algorithm, which can identify humans in the video data and also particular characteristics of the identified humans such as gender, age, colour of clothing or particular clothing items (eg wearing a hat). Another example would be vehicle detection which can identify vehicles in the video data and also particular characteristics such as model, colour and license plate.

Other video analytics software modules can detect and identify activities or behaviour. An example would be a video analytics module used to analyse video data from a shopping mall which can identify suspicious behaviour such as loitering, shoplifting or pickpocketing. Another example would be a video analytics module used to analyse video data in a hospital or care home environment that can identify a patient in distress, for example someone falling over. Another example would be a video analytics module used for traffic monitoring which can detect illegal traffic manoeuvres or traffic accidents.

A video surveillance camera can be loaded with whichever video analytics modules are appropriate for its installation environment or purpose.

All of these machine learning algorithms require large quantities of training data, and are typically trained using standard databases of training data which will comprise image data obtained from a variety of sources under a variety of conditions. However, when a camera is installed, the analytics modules are operating on video data captured under specific conditions of the scene visible to the camera, which might be different to the training data. Differences in imaging conditions, viewpoint, and presence or absence of different objects in the scene, can affect the ability of the algorithm to identify the objects or activities accurately.

To address this circumstance, a solution has been proposed that a camera is installed for a training period, typically 2 weeks, with software including video analytics modules pre-trained using standard training data. The training period may be a period of supervised learning, in which a human operator monitors the video data and the results generated by the video analytics and provides feedback as to whether the objects or activity have been correctly identified. Alternatively, the training period may be a period of unsupervised learning. The training period allows the algorithm to be "fine tuned" under the specific conditions in which the camera is installed.

There are still issues with this approach. There can be longer term changes which means a 2-week (or any limited period of time) period might be inadequate, such as differences between summer and winter which can affect imaging conditions and also the types of clothing worn by humans. In machine learning, this is known as concept drift. Also, in the case of activity detection, it could be that the activity to be detected is not one which happens frequently, such as a traffic accident or a person falling over. In object detection, there may be objects that are rarely encountered, such as unusual models of cars in a vehicle recognition algorithm. Thus, a 2-week training period may not be sufficient to improve the algorithm.

Computer simulated environments have been used for training machine learning algorithms for video surveillance, for example the SynCity simulator provided by Cvedia, or simulations generated by Unity. These companies work closely with clients to produce 3D models and environments that resemble the real-life ones. These environments are then used to generate training data for the real-life deep learning solutions.

SUMMARY OF THE DISCLOSURE

The present disclosure provides a method of training a machine learning algorithm to identify objects or activities in video surveillance data. The method includes generating a 3D simulation of a real environment from video surveillance data captured by at least one video surveillance camera installed in the real environment, synthesizing objects or activities within the simulated 3D environment, and using the synthesized objects or activities within the simulated 3D environment as training data to train the machine learning algorithm to identify objects or activities, wherein the synthesized objects or activities within the simulated 3D environment used as training data are all viewed from the same viewpoint in the simulated 3D environment.

The present disclosure uses a simulation of a real environment simulated using video surveillance data of the real environment, and synthesizes objects or activities within the simulated environment to train the algorithm. The synthesized objects or activities within the simulated 3D environment used as training data are all viewed from the same viewpoint in the simulated 3D environment. Thus, the real environment that a camera is to be installed in can be simulated and the training data viewed from the viewpoint of the camera's intended installation position. This means that the training data is tailored to the environment and viewpoint that the camera is to be installed in, with fixed backgrounds and lighting accurately represented. Because the objects and activities are synthesized, they are known therefore they are already labelled and the labels can be compared with the outcome of the identification by the algorithm. Thus, no human supervision is required for the training period. Furthermore, a greater variety of objects and activities can be generated than would occur in a real life training period. Events or objects that would occur rarely in real life (eg traffic accidents, or medical emergencies) can be synthesized. Also, the 3D simulation can be varied to simulate changes in imaging conditions (eg lighting) or weather conditions. Overall, the training can cover a wider variety of scenarios in a shorter period of time than using a training period in a real world installation.

In addition, using synthesized image data as training data avoids privacy issues with acquiring real life data.

The 3D simulation can be generated from multiple camera views. However, in one embodiment, a video surveillance camera is installed, then image data from the installed video camera is used to generate the 3D simulated environment, and the synthesized objects or activities are viewed in the 3D simulated environment from the same viewpoint as the installed camera in the real environment.

BRIEF DESCRIPTION OF THE DRAWINGS

Embodiments of the present disclosure will now be described, by way of example only, with reference to the accompanying drawings in which.

DETAILED DESCRIPTION

Figure 1:
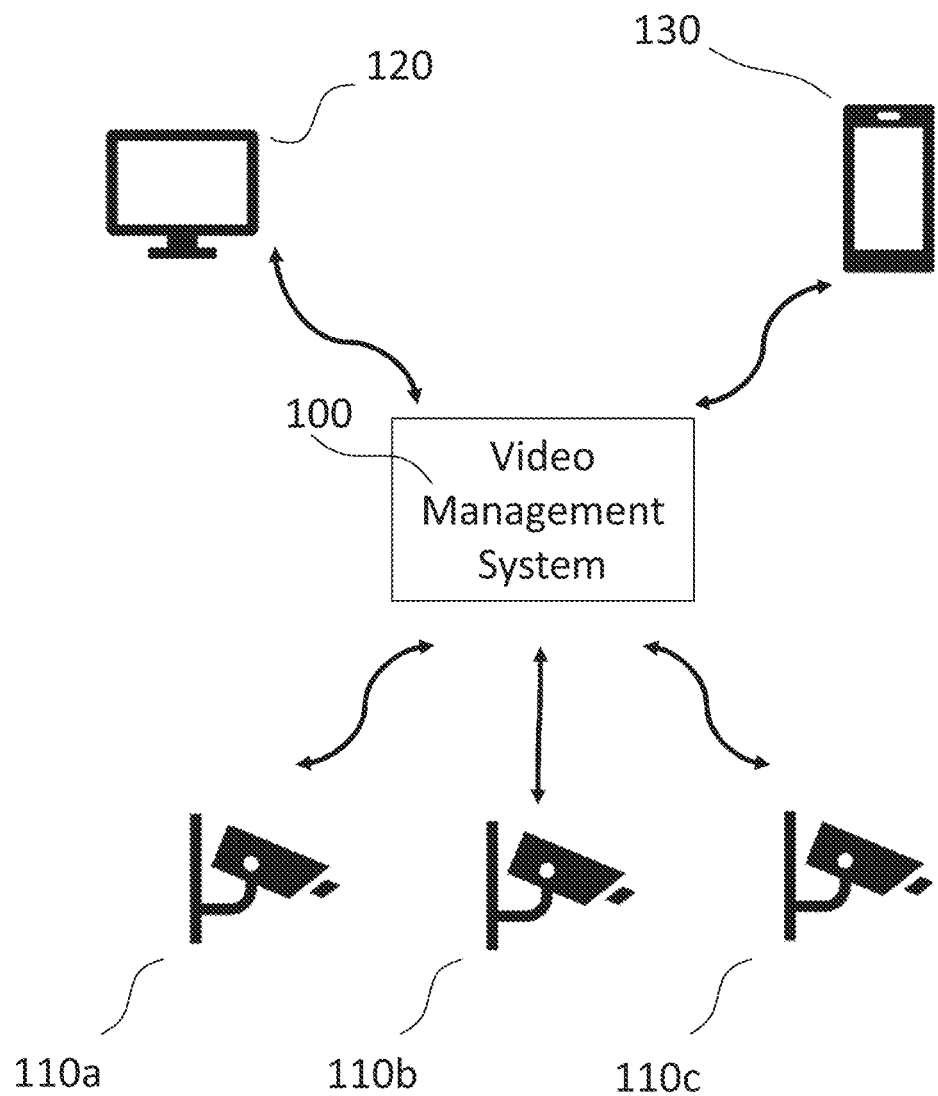
FIG. 1 shows a video surveillance system in which the present disclosure can be implemented.

FIG. 1 shows an example of a video surveillance system (VMS) in which embodiments of the present disclosure can be implemented. The system comprises a video management system 100, a plurality of video surveillance cameras 110*a*, 110*b*, 110*c* and at least one operator client 120 and/or a mobile client 130.

The VMS 100 may include various servers such as a management server, a recording server, an analytics server and a mobile server. Further servers may also be included in the VMS, such as further recording servers or archive servers. The VMS 100 may be an "on premises" system or a cloud-based system.

The plurality of video surveillance cameras 110*a*, 110*b*, 110*c* send video data as a plurality of video data streams to the VMS 100 where it may be stored on a recording server (or multiple recording servers). The operator client 120 is a fixed terminal which provides an interface via which an operator can view video data live from the cameras 110*a*, 110*b*, 110*c*, or recorded video data from a recording server of the VMS 100.

The VMS 100 can run analytics software for image analysis, for example software including machine learning algorithms for object or activity detection. The analytics software may generate metadata which is added to the video data and which describes objects and/or activities which are identified in the video data.

Video analytics software modules may also run on processors in the cameras 110*a*, 110*b*, 110*c*. In particular, a camera may include a processor running a video analytics module including a machine learning algorithm for identification of objects or activities. The video analytics module generates metadata which is associated with the video data stream and defines where in a frame an object or activity has been detected, which may be in the form of coordinates defining a bounding box. The metadata may also define what type of object or activity has been detected eg person, car, dog, bicycle, and/or characteristics of the object (eg colour, speed of movement etc). The metadata is sent to the VMS 100 and stored with the video data and may be transferred to the operator client 120 or mobile client 130 with or without its associated video data. A search facility of the operator client 120 allows a user to look for a specific object, activity or combination of objects and/or activities by searching the metadata. Metadata can also be used to provide alerts to an operator to alert the operator of objects or activities in the video while the operator is viewing video in real time.

Figure 2:
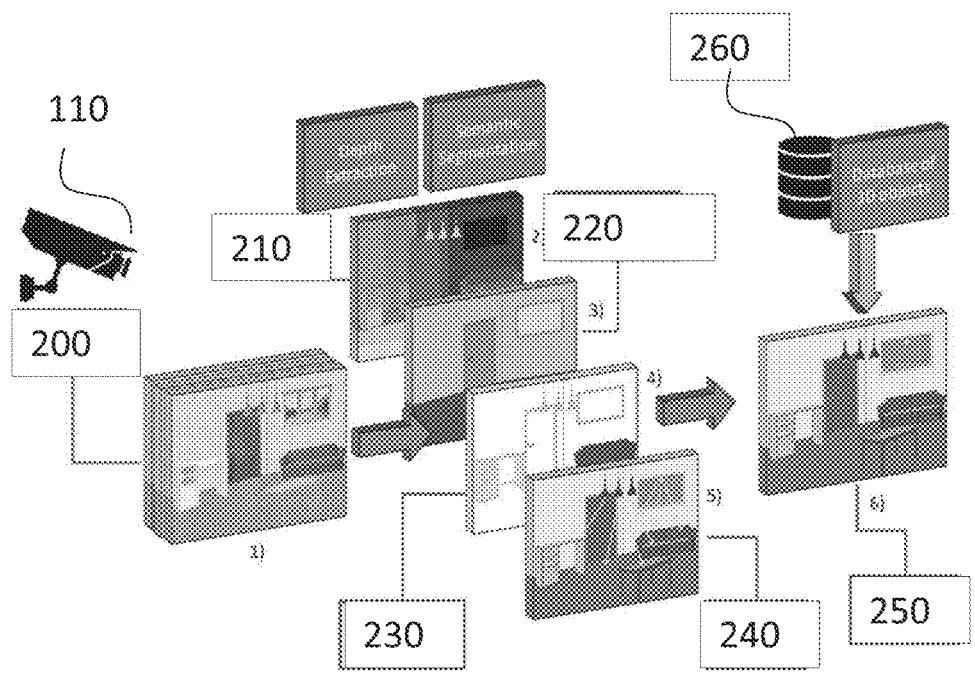
FIG. 2 illustrates the building of a simulated 3D environment from real world 2D images.
Figure 3:
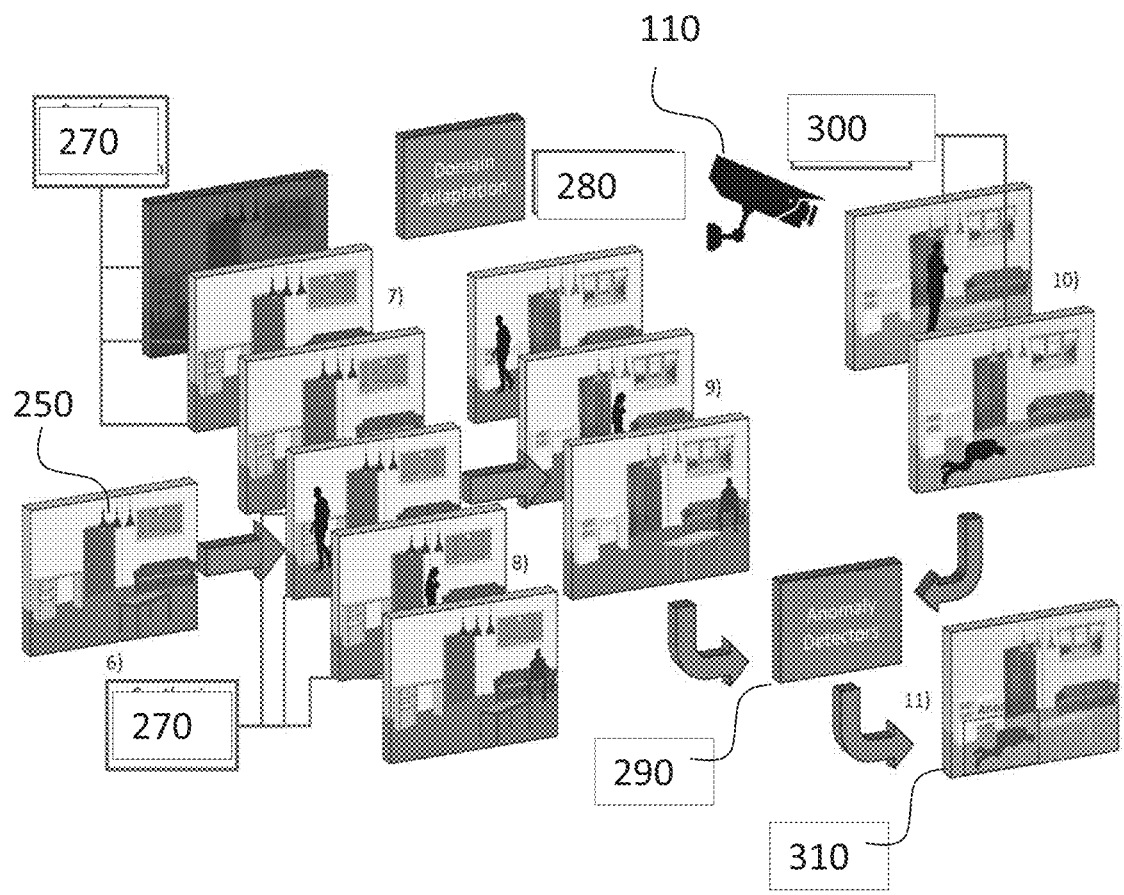
FIG. 3 illustrates the generation of training data using the simulated 3D environment.

A machine learning algorithm requires training using training data. FIGS. 2 and 3 illustrate a method of generating training data and training a machine learning algorithm in a video analytics module running on a processor of a camera 110.

In this embodiment, a camera 110 including a video analytics module including a machine learning algorithm for identifying objects and/or activities is installed in a real-world environment. The machine learning algorithm has already been pre-trained using standard training data of objects or activities in a variety of environments.

As illustrated in FIG. 2, the first step is to generate a 3D simulation of the real environment based on image data 200 captured by the camera 110 in its installation position. The aim is to generate a 3D computer simulated version of the actual view of the camera 110 from the 2D image data 200 captured by the camera 110 in situ.

Both creating digital twin objects from scratch and gathering high-definition 3D reconstructed models and background can be employed in creating custom environments for synthetic data. In recent years the idea of depth estimation using single RGB images has become more popular. Known methods include deep learning using fast Fourier domain analysis [Lee, J. H., Heo, M., Kim, K. R., & Kim, C. S. (2018), "*Single-image depth estimation based on fourier domain analysis*", Proceedings of the IEEE Conference on Computer Vision and Pattern Recognition (pp. 330-339)], using pseudo stereo by synthesizing features from aligned images [Tosi, F., Aleotti, F., Poggi, M., & Mattoccia, S. (2019), "*Learning monocular depth estimation infusing traditional stereo knowledge*", Proceedings of the IEEE/CVF Conference on Computer Vision and Pattern Recognition (pp. 9799-9809)], using ideas from semantic segmentation like an efficient block structure combined with a U-Net architecture [Kopf J., Matzen, K., Alsisan, S., Quigley, O., Ge, F., Chong, Y, . . . & Cohen, M. (2020), "*One shot 3d photography*", ACM Transactions on Graphics (*TOG*), 39(4), 76-1] or using training to learn a depth estimation minimization from consecutive images [Wang, C., Buenaposada, J. M., Zhu, R., & Lucey, S. (2018), "*Learning depth from monocular videos using direct methods*", Proceedings of the IEEE Conference on Computer Vision and Pattern Recognition (pp. 2022-2030)]. Recently, it has been shown that a combination of encoder/decoder architectures based on MobileNet and ResNet can produce highly detailed and hole-free depth map representations [Ignatov, A., Malivenko, G., Plowman, D., Shukla, S., & Timofte, R. (2021), "*Fast and Accurate Single-Image Depth Estimation on Mobile Devices*", Mobile AI 2021 Challenge: Report, Proceedings of the IEEE/CVF Conference on Computer Vision and Pattern Recognition (pp. 2545-2557) and Zhao, C., Sun, Q., Zhang, C., Tang, Y., & Qian, F. (2020), "*Monocular depth estimation based on deep learning: An overview*", Science China Technological Sciences, 1-16.].

Generating 3D meshes and point clouds from single images can be done using combinations of compact object part dictionaries [Pontes, J. K., Kong, C., Sridharan, S., Lucey, S., Eriksson, A., & Fookes, C. (2018, December), "*Image2mesh: A learning framework for single image 3d reconstruction*", Asian Conference on Computer Vision (pp. 365-381). Springer, Cham.] or using an encoder/decoder architecture to create coarse volumes from images [Xie, H., Yao, H., Sun, X, Zhou, S., & Zhang, S. (2019), "*Pix2vox: Context-aware 3d reconstruction from single and multi-view images*", Proceedings of the IEEE/CVF International Conference on Computer Vision (pp. 2690-2698)]. Algorithms proposed by Facebook [Gkioxari, G., Malik, J., & Johnson, J. (2019), "*Mesh R-CNN*", Proceedings of the IEEE/CVF International Conference on Computer Vision (pp. 9785-9795)] expand Mask R-CNN, by representing the detected object with voxels and subsequently refining them using graph neural networks. Databases of shapes and detecting can be used to find the closest possible match, with subsequent deformation layers [Kurenkov, A., Ji, J., Garg, A., Mehta, V., Gwak, J., Choy, C., & Savarese, S. (2018, March), "*Deformnet: Free form deformation network for 3d shape reconstruction from a single image*", 2018 IEEE Winter Conference on Applications of Computer Vision (*WACV*) (pp. 858-866). *IEEE*.] or predictors [Fan, H., Su, H., & Guibas, L. J. (2017), "*A point set generation network for 3d object reconstruction from a single image*", Proceedings of the IEEE conference on computer vision and pattern recognition (pp. 605-613)] for creating the 3d objects.

Semantic segmentation is an ever-expanding field, that is used to achieve pixel level separation of objects of interest, from other objects and background [Siam, M., Gamal, M., Abdel-Razek, M, Yogamani, S., & Jagersand, M (2018, October), "*Rtseg: Real-time semantic segmentation comparative study*", 2018 25th IEEE International Conference on Image Processing (*ICIP*) (pp. 1603-1607). IEEE]. It is used both for indoor and outdoor scenes, with implementations based on LSTMs [Lin, D., Ji, Y, Lischinski, D., Cohen-Or, D., & Huang, H. (2018), "*Multi-scale context intertwining for semantic segmentation*", Proceedings of the European Conference on Computer Vision (*ECCV*) (pp. 603-619)], UNets [Ronneberger, O., Fischer, P., & Brox, T. (2015, October), "*U-net: Convolutional networks for biomedical image segmentation*", International Conference on Medical image computing and computer-assisted intervention (pp. 234-241). Springer, Cham.] and Mask-RCNN [Wu, X., Wen, S., & Xie, Y. A. (2019, August), "*Improvement of Mask-RCNN object segmentation algorithm*", International Conference on Intelligent Robotics and Applications (pp. 582-591). Springer, Cham]. Because of the complexity of the task, many state-of-the-art implementations use additional modules like dual spatial and context processing paths [Yu, C., Wang, J., Peng, C., Gao, C., Yu, G., & Sang, N. (2018), "*Bisenet: Bilateral segmentation network for real-time semantic segmentation*", Proceedings of the European conference on computer vision (*ECCV*) (pp. 325-341)] and criss-cross attention modules [Huang, Z., Wang, X., Huang, L., Huang, C., Wei, Y, & Liu, W. (2019), "*Ccnet: Criss-cross attention for semantic segmentation*", Proceedings of the IEEE/CVF International Conference on Computer Vision].

The present embodiment uses the above techniques to utilize the real-world information coming from surveillance images 200 taken from the installed camera 110 to create a digital twin 3D environments containing the same shape, lighting, objects, and architecture.

As shown in FIG. 2, the system starts with acquiring captured images 200 from the video surveillance camera 110 installed in the real-world environment. The camera view includes different surfaces like walls, floors, ceilings, as well as a number of fixed items—doors and windows as well as non-fixed items—desks, tables, sofas, etc. From one of the captured monocular images 200, a 3D depth map 210 can be synthesized, giving the overall shape and size of the room and the objects inside of it. This depth map can then be used as part of a semantic segmentation algorithm to extract background information 220 describing fixed objects, and foreground information 230 describing non-fixed objects. The background information 220 and the foreground information 230 defines the size and shape of the fixed objects and non-fixed objects respectively and their positions in the field of view. This information is then used together with lighting information 240 gathered about the light conditions in the real environment to build a digital twin using a real time or off-line rendering engine. The final created synthetic 3D environment 250 should resemble the real environment as closely as possible. The building of the synthetic 3D environment 250 uses a database 260 of pre-existing objects, which have their texture, shading, shape and size modified to resemble the ones present in the real environment.

As shown in FIG. 3, once the synthetic 3D environment 250 is built it can be used as a backdrop for synthetic objects and/or activities, to create training image data 270, which is image data (video and/or still) taken from the synthetic 3D environment and viewed from the viewpoint of the camera 110. Digital avatars of a variety of different humans can be added to the synthesized environment 250 in a variety of poses, wearing a variety of clothing, carrying different items. The synthetic environment itself can also be varied by moving around the non-fixed objects identified as part of the foreground information 230 (eg tables, chairs etc). Other objects such as animals, luggage, equipment can also be synthesised. The training image data is image data viewed from the same viewpoint in the synthesized 3D environment 250 as the installation viewpoint of the camera 110 in the real environment.

This is also the same viewpoint as the image data used to generate the synthesized 3D environment 250.

As these objects and activities are presented in a digital twin of the real-world environment, a large number of different scenarios, impossible or hard to replicate in the real-world can be created in the correct conditions. Moreover, because of the 3D nature of the synthetic environment 250, it can be ensured that the scale, proportions and orientation of all objects are to absolute scale.

Finally, a large number of parameters in the synthetic environment 250 can be varied to create adapted training image data 280—different times of the day, different indoor and outdoor lighting, weather conditions, smoke, etc. can all be simulated. The adapted training image data 280 is also image data viewed from the same viewpoint in the synthesized 3D environment 250 as the installation viewpoint of the camera 110 in the real environment, which is also the same viewpoint as the image data used to generate the synthesized 3D environment 250.

Using the created synthesized 3D environment 250, a large and diverse dataset of training images 270, 280 can be created, together with ready made ground truth data—object labels, segmentations, event descriptions, etc. The thus created synthetic training data 270, 280 can be used to train a machine learning algorithm that recognises objects or activities.

FIG. 3 illustrates an example in which the training image data 270, 280, where different normal and abnormal scenarios are present, is used to train an anomaly detection algorithm 290. Through the use of the synthetic data, very hard to reproduce or rarely observed scenarios can be created, expanding the robustness of the anomaly detection algorithm 290. Additionally, by being able to change the way the overall synthetic environmental looks, the effects of concept drift can also be mitigated. To ensure a high algorithm performance on real data, when training on synthetic data, domain adaptation methods are used to generate the adapted image data 280. This mitigates the possible gaps between the visuals of the synthetic and real environments.

Once the machine learning algorithm is trained, it can be used to detect objects or activities in a real-world environment using real image data 300 captured by the camera 110 at the same viewpoint in the real world as the viewpoint of the training data in the synthesized 3D environment 250. In the example shown in FIG. 3, real life image data 300 is input to the anomaly detection algorithm 290 to detect anomalous behaviour 310 such as a person falling over.

Figure 4:
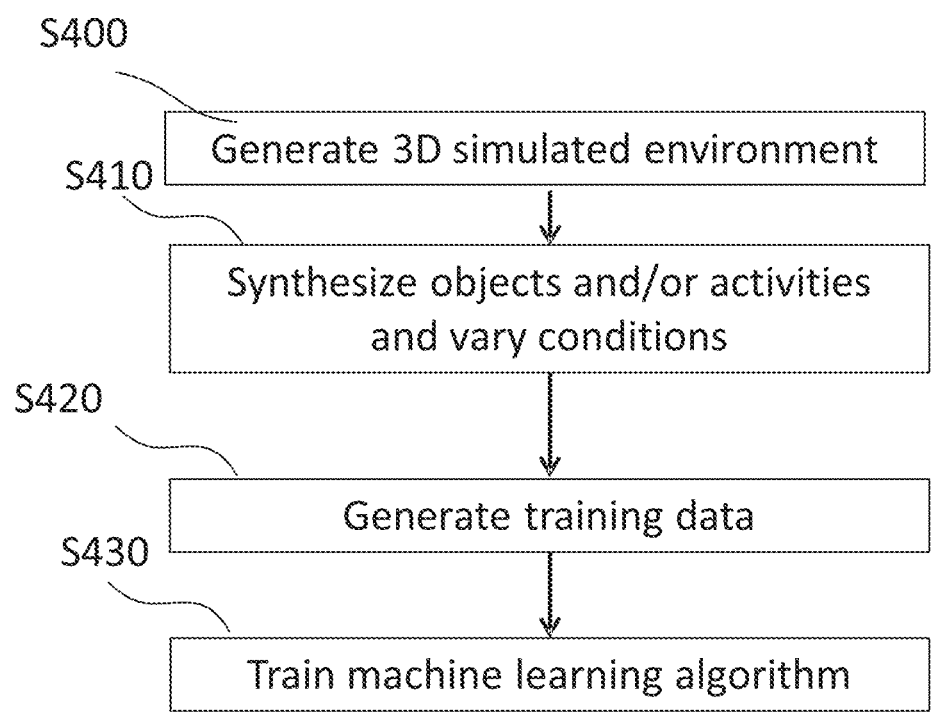
FIG. 4 is a flow chart of a method according to an embodiment of the present disclosure.

FIG. 4 is a flow chart of a method of training a machine learning algorithm to identify objects or activities in video surveillance data.

In step S400, a 3D simulation 250 of a real environment is generated from image data from a camera 110 installed in the real environment.

In step S410, objects or activities are synthesized within the 3D synthesized environment 250 and conditions of the 3D synthesized environment 250 are varied (eg lighting, weather).

In step S420, the training data is generated as image data viewed from a viewpoint in the synthesized environment 250 which is the same as the viewpoint of the camera 110 in the real environment. The training data includes image data including the synthesised objects and activities, and under the varied conditions, to provide as wide as possible a variety of training data. For all of the training data, there is ground truth data associated with the training data which indicates the correct identification for the object or activity or the characteristics of the object or activity that the machine learning algorithm is to be trained to identify. For example, for image data including a human, the ground truth data might include information such as gender, age, colour of clothing, types of clothing (eg hat). For image data including an activity, the ground truth data may indicate a type of anomalous behaviour eg loitering.

In step S430, the training data is used to train the machine learning algorithm by applying the machine learning algorithm to the training data and comparing the results of the object or activity detection with the ground truth data.

After the machine learning algorithm is trained, the video surveillance camera 110 operates in its installation position which has the same viewpoint in the real environment as the viewpoint from which the synthesized objects or activities within the simulated 3D environment used as training data are viewed, and the trained machine learning algorithm is applied to real video surveillance data captured by the video surveillance camera 110.

The above method of training a machine learning algorithm for the detection of objects or activities in video surveillance data can be implemented in the system of FIG. 1. In the case where the machine learning algorithm runs on the edge (ie in a processor in the camera 110a, 110b, 110c), the simulated 3D environment can be generated either in the VMS 100 or in the camera 110a, 110b, 110c, depending on the processing capacity available in the camera. Currently, it is probably preferable for the simulated 3D environment to be built in the VMS 100 as the VMS 100 will typically include multiple servers with the processing capability to carry out the simulation and rendering necessary. However the processing capabilities of cameras are increasing and it is foreseeable that it may be feasible to carry out the building of the simulated 3D environment and the training of the algorithm all within the camera. In the case where the machine learning algorithm runs on the edge, the simulated 3D environment is generated for the real environment in which the specific camera 110a, 110b, 110c on which the machine learning algorithm is to run is installed. If the simulated 3D environment is built in the VMS 100, the VMS receives captured image data from the camera 110, builds the synthesized 3D environment, synthesizes the objects and/or activities in the synthesized 3D environment and generates the training data which is then sent to the camera 110 and used in the camera 110 to train the machine learning algorithm.

The present disclosure could also be utilised to train a machine learning algorithm which runs in the VMS 100. Such a machine learning algorithm will operate on video surveillance data from all of the cameras 110a, 110b, 110c. Therefore, a simulated 3D environment can be generated for each camera 110a, 110b, 110c, and training data from each of the simulated 3D environments can then be used to train the machine learning algorithm.

Another alternative is that image data from multiple cameras could be used in the VMS 100 to generate a single simulated 3D environment. This could be particularly useful in a network where multiple cameras are present with overlapping fields of view. Indeed, if more than one camera captures the same scene from different viewpoints, an improved simulated 3D environment may be generated by using the image data captured from more than one viewpoint. In this embodiment, a single simulated 3D environment can be built on the VMS 100 using image data from a plurality of cameras 110a, 110b, 110c, then a set of training data is generated using the single simulated 3D environment and used to train a machine learning algorithm on one of the cameras. In this case, the training data used to train a machine learning algorithm to be used in one particular camera is generated as viewed from the same viewpoint in the simulated environment as the camera's installation position in the real environment. The same simulated 3D environment can be used to generate different sets of training data viewed from the viewpoints of different cameras and used to train machine learning algorithms for use in the respective cameras.

If images from multiple cameras are used to generate the simulated 3D environment, these need not include images from the installation viewpoint of the camera in which the machine learning algorithm runs, provided that the training data images are from that viewpoint, because when a simulated 3D environment is generated, training data images can be generated from any viewpoint. However, if images from the camera installation viewpoint are used it will probably produce the most realistic simulation from that viewpoint.

The above example of FIGS. 2 and 3 has been described with reference to detection of humans and human behaviour, in an indoor environment. However, other applications are possible. For example, objects to be detected could be vehicles and the environment could be outdoors such as a road intersection. Anomalous behaviour in this case could be illegal turns or traffic accidents. Characteristics of the objects identified by the machine learning algorithm could be vehicle type (eg truck, car, van) model, colour and license plate. This example of cameras monitoring a traffic intersection from different directions is also an example where multiple cameras overlapping views could be used to generate a single synthesized 3D environment.

While the present disclosure has been described with reference to embodiments, it is to be understood that the present disclosure is not limited to the disclosed embodiments. The present disclosure can be implemented in various forms without departing from the principal features of the present disclosure as defined by the claims.

The invention claimed is:

1. A video surveillance method of training a machine learning algorithm to identify activities in video surveillance data by a method comprising the steps of:
   generating a 3D simulation of a real environment from video surveillance data captured by at least one video surveillance camera installed in the real environment;
   synthesizing activities within the simulated 3D environment; and
   using the synthesized activities within the simulated 3D environment as training data to train the machine learning algorithm to identify objects or activities, wherein the synthesized activities within the simulated 3D environment used as training data are all viewed from the same viewpoint in the simulated 3D environment;
   installing a video surveillance camera at the same viewpoint in the real environment as the viewpoint from which the synthesized activities within the simulated 3D environment used as training data are viewed; and
   applying the trained machine learning algorithm to video surveillance data captured by the video surveillance camera.

2. The video surveillance method according to claim 1, wherein the machine learning algorithm is pre-trained using training data comprising image data of activities in different environments, before being trained using the synthesized activities within the simulated 3D environment.

3. The video surveillance method according to claim 1, wherein the simulated 3D environment has a fixed configuration and the method comprises varying imaging conditions and/or weather conditions within the simulated 3D environment and synthesizing the activities under the different imaging and/or weather conditions.

4. The video surveillance method according to claim 1, wherein the video surveillance data used to generate the simulated 3D environment is captured from multiple viewpoints in the real environment.

5. The video surveillance method according to claim 1, wherein the video surveillance data used to generate the simulated 3D environment is captured only from the same viewpoint in the real environment as the viewpoint from which the synthesized activities are viewed in the simulated 3D environment to train the machine learning algorithm.

6. The video surveillance method according to claim 1, wherein the machine learning algorithm runs on a processor in a video surveillance camera and the training of the machine learning algorithm is carried out in the camera.

7. The video surveillance method according to claim 6, wherein the steps of generating the 3D simulation and synthesising the activities to generate the training data is carried out in a server of a video management system and the training data is sent to the video surveillance camera.

8. The video surveillance method according to claim 1, wherein the step of generating a 3D simulation of the real environment comprises:
   acquiring image data of the real environment from the video surveillance camera;
   generating a depth map from the image data; and
   using a semantic segmentation algorithm to label background information and foreground information.

9. A non-transitory computer-readable storage medium storing a computer program comprising code which, when run on a processor causes it to carry out the method according to claim 1.

10. A video surveillance system, comprising:
    a processor configured to:
       generate a 3D simulation of a real environment from video surveillance data captured by at least one video surveillance camera installed in the real environment;
       synthesize activities within the simulated 3D environment;
       generate training data comprising image data comprising the synthesized activities within the simulated 3D environment viewed from a single viewpoint in the simulated 3D environment; and
       use the training data to train a machine learning algorithm to identify activities in video surveillance data; and
    a video surveillance camera installed at the same viewpoint in the real environment as the viewpoint from which the synthesized activities within the simulated 3D environment used as training data are viewed, wherein the processing means is configured to apply the trained machine learning algorithm to video surveillance data captured by the video surveillance camera installed at the same viewpoint in the real environment.

11. The video surveillance system according to claim 10, wherein the processing means includes a first processor in the video surveillance camera that captures the video surveillance data used to generate the 3D simulation, wherein the machine learning algorithm runs on the first processor and the first processor is configured to use the training data to train the machine learning algorithm to identify objects or activities.

12. The video surveillance system according to claim 11, wherein the processing means includes a second processor in a video management system, wherein the second processor is configured to receive the video surveillance data from the video surveillance camera, generate the 3D simulation, synthesize the activities within the simulated 3D environment and generate the training data and send the training data to the first processor.

* * * * *